United States Patent
Clémence et al.

[11] 3,714,163
[45] Jan. 30, 1973

[54] β-(THEOPHYLLINE ETHYL) MONOSULFITE

[75] Inventors: Francois Clémence, Rosny-sous-Bois; Odile Le Martret, Paris, both of France

[73] Assignee: Roussel Uclaf, Paris, France

[22] Filed: Aug. 20, 1970

[21] Appl. No.: 65,659

Related U.S. Application Data

[63] Continuation-in-part of Ser. No. 730,628, May 20, 1968, abandoned.

[30] Foreign Application Priority Data
May 23, 1967  France.............................107454
July 28, 1967  France..............................116130

[52] U.S. Cl.........260/253, 260/210 AB, 260/210 E, 260/210 K, 260/210 NE, 260/210 S, 260/242, 260/256, 260/559 AT, 424/180, 424/227, 424/253
[51] Int. Cl. .......................C07d 57/48, C07d 57/52
[58] Field of Search................260/210 AB, 210 S, 210 K, 210 NE

[56] References Cited

UNITED STATES PATENTS 3,352,864  11/1967  Guiroy.............................260/253

*Primary Examiner*—Alex Mazel
*Assistant Examiner*—Anne Marie T. Tighe
*Attorney*—Hammond & Littell

[57] ABSTRACT

As a new compound β-(theophylline ethyl) monosulfite having the formula

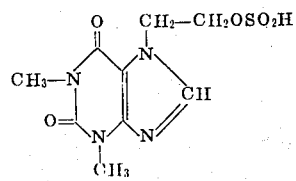

and salts thereof with inorganic and organic bases, their process of preparation and as an antibacterial agent, the tetracycline salt of β-(theophylline ethyl) monosulfite.

3 Claims, No Drawings

β-(THEOPHYLLINE ETHYL) MONOSULFITE

PRIOR APPLICATIONS

The present application is a continuation-in-part application of our copending, commonly assigned U. S. Pat. application Ser. No. 730,628, filed May 20, 1968, now abandoned.

OBJECTS OF THE INVENTION

It is an object of the invention to provide the novel products β-(theophylline ethyl) monosulfite and the salts thereof.

It is another object of the invention to provide a novel process for the preparation of β-(theophylline ethyl)monosulfite.

It is a further object of the invention to provide novel antibacterial compositions.

It is an additional object of the invention to provide a novel method of treating microbial infections in warm-blooded animals.

These and other objects and advantages of the invention will become obvious from the following description.

THE INVENTION

The novel product of the invention is β-(theophylline ethyl) monosulfite which is a strong acid and which forms stable, well-defined salts with inorganic and organic bases and amino acids. The said acid and its salts are very soluble in water.

The salts of β-(theophylline ethyl) monosulfite theophylline are useful in the paper industry and textile industry for impregnation or induction of cellulose fibers on articles to prevent proliferation of fungi, development of molds or bacteria and the occurrence of disagreeable odors in fermentation.

The said salts of the invention are also useful in the pharmaceutical industry since their excellent solubility in water permits the preparation of aqueous injectable solutions or of aerosols. Due to this water solubility, the injectable solutions have the advantage of greatly improved, activity, diffusibility and/or speed of action, particularly if it is a salt of a basic antibiotic. The said salts are also useful for preparing medicamental dressings of cellulose or artificial fibers when an external therapeutic action is desired.

Examples of suitable salts of β-(theophylline ethyl)-monosulfite are the alkali metal, alkaline earth metal, magnesium and aluminum salts and other therapeutically compatible metals; salts of aliphatic, arylaliphatic, cycloalkyl and heterocyclic amines, salts of basic antibiotics such as neomycin B, neomycin C, tetracycline, streptomycin, erythromycin, kanamycin, colimycin, hygromycin, hydroxymycin, etc.; salts of amino acids such as lysin, valine, phenylalanine, tyrosine, tryptophane, leucine, etc.; and salts of quaternary ammonium compounds such as choline tubocurarine, betaine, α-trimethylamino-ε-amino-caproic acid, α,2-bis(trimethylamino)-caproic acid.

Examples of specific salts which are useful are:
sodium salt of β-(theophylline ethyl) monosulfite,
adenosin salt of β-(theophylline ethyl) monosulfite;
pyridoxine salt of β-(theophylline ethyl) monosulfite;
2-dimethylamino-ethanol salt of β-(theophylline ethyl) monosulfite;
2-diethylamino-ethanol salt of β-(theophylline ethyl) monosulfite;
β-dimethylaminoethylbenzhydryl ether salt of β-(theophylline ethyl) monosulfite;
tetracycline salt of β-(theophylline ethyl) monosulfite;
lysin salt of β-(theophylline ethyl) monosulfite;
valine salt of β-(theophylline ethyl) monosulfite;
threonine salt of β-(theophylline ethyl) monosulfite;
betaine salt of β-(theophylline ethyl) monosulfite, and
papaverine salt of β-(theophylline ethyl) monosulfite.

The novel process of the invention for the preparation of β-(theophylline ethyl) monosulfite comprises reacting 7-[β-chloroethyl]-theophylline with a metal sulfite to form the metal salt of β-(theophylline ethyl) monosulfite which is acidified to obtain the free acid.

The salts of β-(theophylline ethyl) monosulfite theophylline are prepared according to the usual methods of salification by using either a mineral or organic base or a salt thereof, the anion of which is easily isolable or eliminated, such as for example, a carbonate or a silicate. The salification is preferably effected in water, but may be effected in an organic solvent in the presence or in the absence of water.

A preferred mode of the process of the invention comprises reacting 7-[β-chloroethyl]-theophylline with an alkali metal sulfite at a temperature greater than 60° C. The formation of the alkali metal salts is preferably effected by reaction of β-(theophylline ethyl) monosulfite with an alkali metal hydroxide, carbonate or bicarbonate. The formation of an organic base salt is preferably effected with a base such as 2-dimethylamino-ethanol, 2-diethylamino-ethanol, or β-dimethylamino-ethylbenzhydryl ether. The formation of a heterocyclic base salt is preferably effected with a nitrogenated compound such as pyridoxine or adenosin. The formation of a basic antibiotic salt is preferably effected with an antibiotic such as streptomycin or tetracycline. The formation of a quaternary ammonium salt is preferably effected with a quaternary ammonium hydroxide such as choline or a betaine such as betaine, α-trimethyl-amino -ε- aminocaproic acid, or α,2-bis-(trimethylamino)-caproic acid.

The novel antibiotic and antibacterial compositions of the invention are comprised of the tetracycline salt of β-(theophylline ethyl) monosulfite and a major amount of a pharmaceutical carrier. The compositions may be in the form of injectable solutions dispensed in ampoules, in multi-dose phials or as sterile powder for the extemporaneous preparation of injectable solutions, as tablets, coated tablets, aromatized powder, granules, emulsions, syrups, suppositories, ovules, intravaginal tablets, ointments, creams, nose and ear drops, eye-wash, mouth-wash, and topical pulverized powders. The said compositions are useful for the treatment of staphylococci, streptococci and infections caused by Gram-negative bacteria such as typhoid bacilli.

The method of combatting bacteria infections in warm-blooded animals comprises administering to warm-blooded animals having a bacteria infection an effective amount of tetracycline salt of β-(theophylline ethyl) monosulfite. The said product may be administered orally, transcutaneously, rectally or topically on the skin or mucosa. The usual useful dose is 3.5 to 13.5 mg/kg depending upon the method of administration.

In the following examples there are described several preferred embodiments to illustrate the invention. However, it should be understood that the invention is not intended to be limited to the specific embodiments.

EXAMPLE I

Preparation of β-(theophylline ethyl) monosulfite

A solution of 72.6 gm of 7-[β-chlorethyl]-theophylline (obtained by the process described by DiPaco, Ann. Chim. Roma, Vol. 47, pp. 698–704, 1957) in 1,000 cc of water and a solution of 41.6 gm of sodium sulfite in 200 cc of water was refluxed for 7 hours and the resulting solution was filtered and evaporated to dryness under reduced pressure. The residue was taken up in 200 cc of hydrochloric acid and after filtering off the mineral precipitate, the filtrate was evaporated to dryness. The residue was washed with alcohol and dried to obtain 68 gm of β-(theophylline ethyl) monosulfite which was purified by dissolving in water and precipitating with acetone. The 65 percent yield of β-[theophylline ethyl] monosulfite has a melting point of 320° C. It occurred in the form of colorless crystals, very soluble in water and insoluble in alcohol, acetone, ether and benzene.

Analysis: $C_9H_{12}N_4O_5S$;  Molecular weight = 288.29
Calculated:  C 37.50 percent  H 4.19 percent  N 19.44 percent
Found:  37.3   4.3   19.1
Infrared Spectrum (Nujol)
Absence of NH at about 3,300 – 3,500 cm–1
Presence of C=O at 1,675 cm$^{-1}$;
Presence of R—SO—$_3$(—) at 1,150 and 1,060 cm–1

As far as is known, this compound is not described in the literature.

EXAMPLE II

Sodium salt of β-(theophylline ethyl) monosulfite 28.8 gm of β-(theophylline ethyl) monosulfite dissolved in 65 cc of water were added to a solution of 4 gm of sodium hydroxide in 10 cc of water to obtain an alkaline pH of the order of 8. The solution was evaporated to dryness under reduced pressure and the residue was washed with alcohol and dried to obtain 27.5 gm (Yield: 89 percent) of sodium salt of β-(theophylline ethyl) monosulfite in the form of colorless crystals, melting at about 340° C.

Analysis: $C_9H_{11}N_4O_5NaS$; molecular weight = 310.28
Calculated: N 18.06 percent
Found: 18.0

As far as is known, this compound is not described in the literature.

EXAMPLE III

Adenosin Salt of β-(theophylline ethyl) monosulfite 2.67 gm of adenosin were added to a solution of 2.88 gm of β-(theophylline ethyl) monosulfite in 20 cc of water, and after the solution was evaporated to dryness under reduced pressure, the residue was washed with alcohol and dried. The product thus obtained was purified by dissolving it in water and precipitating with acetone to obtain 3.14 gm (56 percent yield) of adenosin salt of β-(theophylline ethyl) monosulfite having a melting point of 178° C. The product occurred in the form of a microcrystalline compound, very soluble in water and insoluble in alcohol and the usual organic solvents.

Analysis: $C_{19}H_{25}N_9O_9S$; molecular weight = 555.52
Calculated N 22.69 percent
Found: 21.4

As far as is known, this compound is not described in the literature.

EXAMPLE IV

Pyridoxine salt of β-(theophylline ethyl) monosulfite

Using the procedure of Example III, 2.88 gm of β-(theophylline ethyl) monosulfite and 1.69 gm of pyridoxine produced 4.3 gm (yield 72 percent) of crystals of pyridoxine salt of β-(theophylline ethyl) monosulfite which were purified by recrystallization from alcohol.

The product occurred in the form of colorless crystals, soluble in water and had a melting point of 169° C.

Analysis: $C_{17}H_{23}N_5O_8S$   molecular weight = 457.46
Calculated: N 15.31 percent
Found: 15.3

As far as is known, this compound is not described in the literature.

EXAMPLE V

Dimethylamino-ethanol salt of β-(theophylline ethyl) monosulfite 1.78 gm of dimethylamino-ethanol were added to a solution of 5.76 gm of β-(theophylline ethyl) monosulfite in 12 cc of water and the solution was evaporated to dryness under reduced pressure. The residue was washed with isopropanol, dried and recrystallized from alcohol to obtain 5.4 gm of dimethylamino-ethanol salt of β-(theophylline ethyl)monosulfite melting at 188° C. The product occurred in the form of colorless crystals soluble in water and insoluble in acetone.

Analysis: $C_{13}H_{23}N_5O_6S$; molecular weight = 377.42
Calculated: N 18.55 percent
Found: 18.54

As far as is known, this compound is not described in the literature.

EXAMPLE VI

Diethylaminoethanol Salt of β-(theophylline ethyl) monosulfite

Using the procedure of Example V, 2.88 gm of β-(theophylline ethyl)monosulfite and 1.17 gm of diethylamino-ethanol were reacted to obtain after recrystallization from isopropanol 3.1 gm (yield: 76.5 percent) of diethylamino-ethanol salt of β-(theophylline ethyl) monosulfite melting at 153° C.

The product occurred in the form of colorless crystals soluble in water and methanol and insoluble in acetone and ether.

Analysis: $C_{15}H_{27}N_5O_6S$;  Molecular weight = 405.47
Calculated: N 17.27 percent
Found: 17.36

As far as is known, this compound is not described in the literature.

EXAMPLE VII

β-dimethyl-amino-ethylbenzhydryl-ether salt of β-(theophylline ethyl) monosulfite Using the procedure of Example V, 2.88 gm of β-(theophylline ethyl) monosulfite and 2.55 gm of β- dimethyl-amino-ethylbenzhydryl-ether were reacted to obtain after recrystallization from alcohol, 3.68 gm (yield: 68 percent) of dimethyl-amino-ethylbenzhydryl-ether salt of β-(theophylline ethyl) monosulfite melting at 192° C.

The product occurred in the form of colorless crystals soluble in water.
Analysis: $C_{26}H_{33}N_5O_6S$; molecular weight = 543.62
Calculated: N 12.88 percent
Found: 12.85 percent As far as is known, this compound is not described in the literature.

EXAMPLE VIII dl-threonine salt of β-(theophylline ethyl)monosulfite 2.88 gm of β-(theophylline ethyl) monosulfite were dissolved in 9 cc of water and a solution of 1.19 gm of threo-α-amino-β-hydroxybutyric acid in 10 cc of water was added thereto. The solution was evaporated to dryness under reduced pressure and the residue was washed with alcohol and recrystallized from methanol to obtain 1.52 gm (Yield: 37 percent) of dl-threonine salt of β-(theophylline ethyl) monosulfite melting at 226° C.

The product occurred in the form of colorless crystals soluble in water.
Analysis: $C_{13}H_{21}N_5O_8S$; molecular weight = 407.40
Calculated: N 17.19 percent
Found: 17.08

As far as is known, this compound is not described in the literature.

EXAMPLE IX

Lysin salt of β-(theophylline ethyl) monosulfite

Using the procedure of Example VIII, 2.88 gm of β-(theophylline ethyl) monosulfite and 1.46 gm of L(+)-lysin were reacted to obtain, after recrystallization from alcohol, 2.35 gm (yield: 56 percent) of lysin salt of β-(theophylline ethyl) monosulfite in the form of colorless needles very soluble in water and melting at 267° C.
Analysis: $C_{15}H_{26}N_6O_7S$: Molecular weight = 437.47
Calculated: N 19.34 percent
Found: 19.4

As far as is known, this compound is not described in the literature.

EXAMPLE X

Valine Salt of β-(theophylline ethyl) monosulfite

Using the procedure of Example VIII, 2.88 gm of β-(theophylline ethyl) monosulfite and 1.17 gm of dl-valine were reacted to obtain, after recrystallization from alcohol, 2.39 gm (yield: 59 percent) of valine salt of β-(theophylline ethyl) monosulfite in the form of needles very soluble in water and melting at 202° C.
Analysis: $C_{14}H_{23}N_5O_7S$: molecular weight = 405.43
Calculated: N 17.27 percent
Found: 17.0

As far as is known, this compound is not described in the literature.

EXAMPLE XI

Betaine Salt of β-(theophylline ethyl)-monosulfite

Using the procedure of Example VIII, 2.88 gm of β-(theophylline ethyl)-monosulfite and 1.17 gm of betaine were reacted to obtain, after recrystallization from alcohol, 2.63 gm (yield: 65 percent) of betaine salt of β-(theophylline ethyl)-monosulfite in the form of colorless crystals very soluble in water, slightly soluble in alcohol and melting at 253° C.
Analysis: $C_{14}H_{23}N_5O_7S$; Molecular weight = 405.43
Calculated: N 17.27 percent
Found: 17.42

As far as is known, this compound is not described in the literature.

EXAMPLE XII

Calcium salt of β-(theophylline ethyl) monosulfite 5.76 gm of β-(theophylline ethyl) monosulfite were dissolved in 18 cc of water and 0.74 gm of calcium hydroxide were added thereto. After agitation, the dissolution was total and the solution was evaporated to dryness. The residue was taken up in the minimum of hot 75 percent alcohol and after cooling, calcium salt of β-(theophylline ethyl) monosulfite crystallized.

The product was separated, suction filtered and dried to obtain a yield of 86 percent pure product.

The said calcium salt occurred in the form of colorless crystals which were soluble in water and melted at a temperature greater than 380° C.
Analysis: $C_{18}H_{22}CaN_8O_{10}S_2$ ; molecular weight = 614.66
Calculated: N 18.23 percent    Ca 6.52 percent
Found: 18.21    6.52

As far as is known, this compound is not described in the literature.

EXAMPLE XIII

Magnesium salt of β-(theophylline ethyl) monosulfite

Using the procedure of Example XII, 2.88 gm of β-(theophylline ethyl) monosulfite and 0.29 gm of magnesium hydroxide were reacted to obtain, after crystallization from 95 percent alcohol, an 81 percent yield of the magnesium salt of β-(theophylline ethyl) monosulfite in the form of colorless crystals which were soluble in water and had a melting point greater than 360° C.
Analysis: $C_{18}H_{22}MgN_8O_{10}S_2$; molecular weight — 598.87
Calculated: N 18.7 percent Mg 4.06 percent
Found: 18.92    4.18

As far as is known, this compound is not described in the literature.

EXAMPLE XIV

Papaverine Salt of β-(theophylline ethyl) monosulfite 2.88 gm of β-(theophylline ethyl) monosulfite were dissolved in 15 cc of water and under agitation 3.39 gm of papaverine were added thereto. The product dissolved rapidly and the solution thus obtained was evaporated to dryness. The residue was washed with alcohol and then recrystallized in the hot and cold in 95 percent alcohol to obtain papaverine salt of β-(theophylline ethyl) monosulfite.

The product occurred in the form of yellow crystals soluble in water and melting at 237° C.
Analysis: $C_{29}H_{33}N_5O_9S$; molecular weight = 627.66
Calculated N 11.16 percent Found: 11.22

As far as is known, this compound is not described in the literature.

EXAMPLE XV

Tetracycline salt of β-(theophylline ethyl) monosulfite 26.31 gm of tetracycline base were dissolved in 1,050 cc of methanol and 16.72 gm of β-(theophylline ethyl) monosulfite were added thereto. The solution was evaporated to dryness under reduced pressure and the residue was washed with ether and dried to obtain 43 gm of tetracycline salt of β-(theophylline ethyl) monosulfite. The product occurred in the form of a light yellow microcrystalline powder soluble in water and methanol, slightly soluble in ethanol, insoluble in ether, melting at about 250° C with decomposition and having a specific rotation $[\alpha]_D^{25} = -168° \pm 1°$ (C=1 percent in water.
Analysis: $C_{31}H_{36}N_6O_{13}S$; molecular weight = 732.71
Calculated: N 11.47 percent
Found: 11.49

As far as is known, this compound is not described in the literature.

PHARMACOLOGICAL STUDY

A. In vivo treatment of staphylococci infections

Groups of 10 mice were infected intraperitoneally with 0.30 cc of a staphylococcus culture strain TIN and then the mice received orally or subcutaneously dosages of either 0.66 mg of tetracycline hydrochloride or 1 mg of tetracycline salt of β-(theophylline ethyl) monosulfite for 2 days which dosages are equivalent amounts of tetracycline base. The therapeutic effect was determined by the mortality rate and the results are shown in Table I.

TABLE I

| Administration method | Tetracycline salt of β-(theophylline ethyl) monosulfite | | Tetracycline hydrochloride | |
|---|---|---|---|---|
| | Dose in mg | % Therapeutic Action | Dose in mg | % Therapeutic Action |
| Orally | 1 | 100 | 0.66 | 100 |
| | 0.50 | 87 | 0.33 | 85 |
| | 0.20 | 29 | 0.13 | 32 |
| Subcutaneously | 1 | 100 | 0.66 | 100 |
| | 0.50 | 100 | 0.33 | 100 |
| | 0.205 | | 0.13 | 72 |

B. Typhus Bacilli Infection.

Groups of 10 mice were infected experimentally by inoculation of a typhus bacilli culture and the animals then received orally a single dose of tetracycline hydrochloride or tetracycline salt of β-(theophylline ethyl) monosulfite. The results reported in Table II show that the compound of the invention is at least equal to that of tetracycline hydrochloride.

TABLE II

| Tetracycline Salt of β-(theophylline ethyl) monosulfite | | Tetracycline hydrochloride | |
|---|---|---|---|
| Dose in mg | % Therapeutic action | Dose in mg | % Therapeutic action |
| 4 | 72 | 2.64 | 62 |
| 3 | 42 | 2.0 | 34 |
| 2 | 28 | 1.32 | 24 |
| 1 | 3 | 0.66 | 0 |

C. Hemolytic infections of Staphylococcus aureus

Three groups of 10 Swiss strain mice weighing about 24 gm each were used in this experiment. The first lot served as controls and received intravenously 0.2 cc of an 18 hours culture of Staphylococcus aureus LW strain in Oxoid No. II medium. The second and third groups received intravenously 0.2cc of the same culture 20 minutes after the oral administration of tetracycline hydrochloride equal to 1 mg of tetracycline and the tetracycline salt of β-(theophylline ethyl) monosulfite equal to 1 mg of tetracycline respectively. The treatment was continued orally for 10 days at the rate of one intubation per day at the same dose.

On the 11th day, the animals were killed and the renal lesions in all mice were counted. The results are summarized in the following table.

TABLE III

| Groups | No. of mice dead by 11th day | No. of mice with visible renal lesions |
|---|---|---|
| Controls | 8 out of 10 | 5 |
| Tetracycline hydrochloride | 2 out of 10 | 5 |
| Tetracycline salt of β-(theophylline ethyl) monosulfite | 0 out of 10 | 2 |

The results of the above Table demonstrate the good tolerance and efficiency of the salt of the invention as compared to tetracycline hydrochloride.

Moreover, fewer visible renal lesions were found in the animals treated with the novel salt of the invention as compared to tetracycline hydrochloride.

D. Acute Toxicity

The acute toxicity was determined on Swiss strain mice having an average weight of 18 to 22 gm by intravenously administering to groups of 10 mice increasing doses of the tetracycline salt of β-(theophylline ethyl) monosulfite and the $LD_{50}$ was calculated by the method of Dragstaedt and Lang to be 296 mg/kg.

E. Sub-acute toxicity

Rats of about 140 gm received daily by an esophogus tube for 21 days increasing doses of the said tetracycline salt in 1 cc of water and control rats received only the 1 cc of water. The animals' weight was measured every day and at the end hematological tests were conducted on groups of three rats per dose. The results in the next tables show that the said product does not affect the ponderal growth nor disturb the hemopoietic and leuco-forming organs.

TABLE IV

| | 480 mg./kg. | 240 mg./kg. | 96 mg./kg. | Control tests | Normal formula |
|---|---|---|---|---|---|
| Red corpuscles | 8,930,000 | 8,870,000 | 7,850,000 | 8,400,000 | 7–10,000,000 |
| White corpuscles | 15,440 | 14,950 | 14,890 | 14,630 | 6–15,000 |
| Rate of hemoglobin (Tallquist) | 80 | 80 | 80 | 80 | |
| Lymphocytes, percent | 77.6 | 66.5 | 77.2 | 63.5 | 60–70 |
| Monocytes, percent | 1.6 | 0.5 | 0.7 | 2.3 | 0–2 |
| Polynuclear neutrophiles, percent | 20 | 31.9 | 21.7 | 33.6 | 30–35 |
| Polynuclear eosinophiles, percent | 1.9 | 0.5 | 0.7 | 1.1 | 0–2 |
| Polynuclear basophiles, percent | 0 | 0 | 0 | 0 | 0–4 |

TABLE V

| | Controls | | 480 mg./kg. | | 240 mg./kg. | | 96 mg./kg. | |
| --- | --- | --- | --- | --- | --- | --- | --- | --- |
| | Number of rats | Average weight, g. | Number of rats | Average weight, g. | Number of rats | Average weight, g. | Number of rats | Average weight, g. |
| Initial weight | 10 | 135 | 10 | 147 | 10 | 141 | 10 | 134 |
| 1st ingestion | 10 | 137 | 10 | 149 | 10 | 143 | 10 | 138 |
| 2nd ingestion | 10 | 153 | 10 | 158 | 10 | 155 | 10 | 147 |
| 3rd ingestion | 10 | 169 | 10 | 179 | 10 | 179 | 10 | 165 |
| 4th ingestion | 10 | 166 | 10 | 176 | 10 | 179 | 10 | 163 |
| 5th ingestion | 10 | 176 | 10 | 183 | 10 | 187 | 10 | 173 |
| 6th ingestion | 10 | 174 | 10 | 186 | 10 | 195 | 10 | 180 |
| 7th ingestion | 10 | 187 | 10 | 194 | 10 | 204 | 10 | 186 |
| 8th ingestion | 9 | 201 | 10 | 213 | 10 | 220 | 10 | 201 |
| 9th ingestion | 9 | 204 | 10 | 213 | 10 | 219 | 10 | 200 |
| 10th ingestion | 9 | 211 | 10 | 219 | 10 | 229 | 10 | 213 |
| 11th ingestion | 9 | 215 | 10 | 223 | 10 | 229 | 10 | 211 |
| 12th ingestion | 9 | 219 | 10 | 232 | 10 | 237 | 10 | 223 |
| 13th ingestion | 9 | 222 | 10 | 240 | 10 | 244 | 10 | 231 |
| 14th ingestion | 9 | 207 | 10 | 244 | 10 | 247 | 10 | 234 |
| 15th ingestion | 9 | 237 | 10 | 248 | 10 | 251 | 10 | 243 |
| 16th ingestion | 9 | 237 | 10 | 249 | 10 | 255 | 10 | 242 |
| 17th ingestion | 9 | 240 | 10 | 252 | 10 | 259 | 10 | 248 |
| 18th ingestion | 9 | 254 | 10 | 271 | 10 | 276 | 10 | 263 |
| 19th ingestion | 9 | 257 | 10 | 274 | 9 | 280 | 10 | 268 |
| 20th ingestion | 9 | 261 | 10 | 278 | 9 | 282 | 10 | 269 |
| 21st ingestion | 9 | 263 | 10 | 281 | 9 | 285 | 10 | 271 |
| Increase of weight in percent | +94.8 | | +91.2 | | +102.2 | | +102.3 | |

Various modifications of the compositions and method of the invention may be made without departing from the spirit or scope thereof and it is to be understood that the invention is intended to be limited only as defined in the appended claims.

We claim:

1. A compound selected from the group consisting of β-(theophylline ethyl) monosulfite having the formula

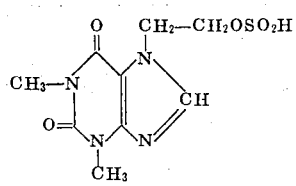

and salts thereof with a basic antibiotic selected from the group consisting of neomycin B, neomycin C, tetracycline, streptomycin, kanamycin, colimycin, hygromycin and hydroxymycin.

2. A compound of claim 1 which is β-(theophylline ethyl) monosulfite.

3. A compound of claim 1 which is the tetracycline salt of β-(theophylline ethyl) monosulfite.

* * * * *